United States Patent [19]
Nakaya

[11] 3,945,258
[45] Mar. 23, 1976

[54] DIAL GAUGE MEASURING THE LENGTH IN TWO DIFFERENT UNITS

[75] Inventor: Tadao Nakaya, Utsunomiya, Japan

[73] Assignee: Kabushiki Kaisha Mitutoyo Seisakusho, Tokyo, Japan

[22] Filed: June 24, 1974

[21] Appl. No.: 482,637

[30] Foreign Application Priority Data
June 28, 1973   Japan .................. 48-076987[U]

[52] U.S. Cl. ............... 74/29; 73/432 A; 74/409
[51] Int. Cl.² ............................................. F16H 19/04
[58] Field of Search ............... 74/29, 409; 73/432; 33/172

[56] References Cited
UNITED STATES PATENTS

| | | | |
|---|---|---|---|
| 2,117,287 | 5/1938 | Bloch | 73/432 A |
| 2,846,769 | 8/1958 | Colont | 33/172 R |
| 3,365,723 | 1/1968 | Sportmann | 74/409 |
| 3,636,790 | 1/1972 | Bertrang et al. | 74/409 |

Primary Examiner—Benjamin W. Wyche
Assistant Examiner—Wesley S. Ratliff, Jr.
Attorney, Agent, or Firm—Brisebois & Kruger

[57] ABSTRACT

Dial gauge for measuring length in two different units, characterized in that a first gear and a second gear are mounted to rotate with a pinion which meshes with a spindle rack; a center pinion fixed to a first pointer meshes with said first gear; a pinion fixed to a second pointer meshes with said second gear; and the gear ratio between said center pinion fitted with the first pointer and said first gear is different from the gear ratio between said pinion fitted with the second pointer and said second gear.

4 Claims, 2 Drawing Figures

DIAL GAUGE MEASURING THE LENGTH IN TWO DIFFERENT UNITS

BACKGROUND OF THE INVENTION

The conventional dial gauge indicates the measured displacement of the spindle in one unit on the dial. Therefore, for conversion of the measured result, say, from millimeters to inches, a conversion table has to be consulted and accordingly the calculation causes a considerable bother.

The present invention, in which the measured displacement of the spindle can be simultaneously indicated in two different units on the dial, can eliminate this trouble.

SUMMARY OF THE INVENTION

The primary object of the present invention is to provide a dial gauge which can indicate the measured displacement of the spindle in two different units at the same time.

Another object of the present invention is to provide a high precision dial gauge equipped with a means for eliminating the backlash in the gear group rotated by the spindle.

Other objects of the present invention will become apparent from the following description of an embodiment of the present invention.

DETAILED DESCRIPTION

Figure 1:
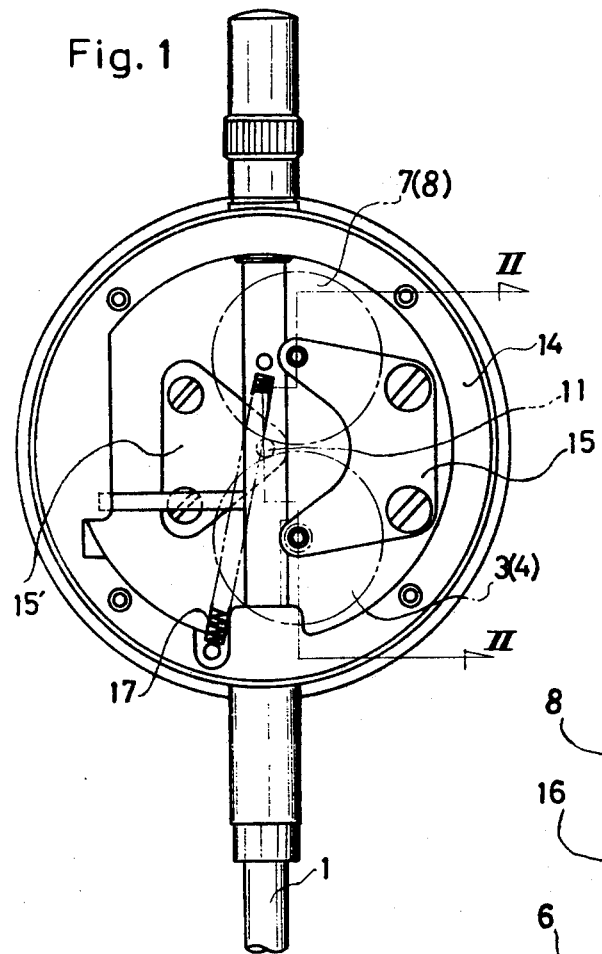
FIG. 1 shows the rear of a dial gauge which embodies the present invention, with the back plate removed.
Figure 2:
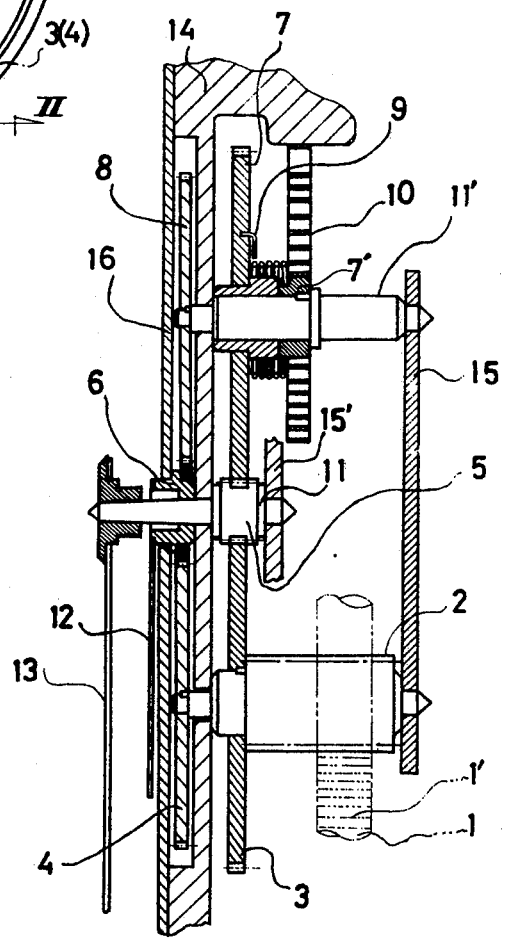
FIG. 2 is an enlarged view of a section taken along the line II—II of in FIG. 1.

The spindle 1 is biased downward by a spring 17 stretched between the frame 14 and the spindle 1. The pinion 2 meshing with the rack 1' of the spindle 1 is rotatably supported between the dial gauge frame 14 and the supporting plate 15 screwed to said frame 14. The first gear wheel 3 is fastened to the shaft of the pinion 2, while the second gear wheel 4 is fastened to a portion of said shaft projecting from said frame 14. The shaft 11 to which the pinion 5 meshing with said first gear wheel 3 is fastened extends through said frame 14 and it is rotatably supported between said frame 14 and the supporting plate 15' screwed to said frame 14. Meanwhile, a driven pinion 6 meshing with said second gear wheel 4 is rotatably mounted on said shaft 11; the dial plate 16 is attached on the outside of said frame 14; and the second pointer 12 is attached to said pinion 6, while the first pointer 13 is attached to said shaft 11.

The gear ratio between the first gear wheel 3 and the pinion 5 is made different from the gear ratio between the second gear wheel 4 and the drive pinion 6; and the number of teeth in the first gear wheel 3, the second gear wheel 4, the pinion 5 and the drive pinion 6 are appropriately determined.

On the other hand, a gear wheel 7 meshing with said pinion 5 is rotatably mounted on the shaft 11' supported between said supporting plate 15 and said frame 14; and a gear wheel 8 meshing with said pinion 6 is fastened to said shaft 11'.

A boss 7' adjacent said gear wheel 7 is fixed on said shaft 11'; a hair spring 10 is attached at its one end to said frame 14 and at its other end to said boss 7'; and the ends of a coil spring 9 stretched on the periphery of said shaft 11' between said gear wheel 7 and said boss 7' are respectively attached to said gear wheel 7 and said boss 7'.

Now, suppose the spindle is displaced right or left in the figure. Then the pinion 2 will convert the linear movement of the spindle 1 to a rotational one, which is transmitted to the first gear wheel 3 and the second gear wheel 4. With rotation of said first and second gear wheels 3, 4, the pinion 5 and the drive pinion 6 respectively meshing with these gear wheels 3, 4 are rotated, whereby the displacement of the spindle 1 is indicated on the dial plate 16 by the first pointer 13 and the second pointer 12.

If the gear ratio between the first gear wheel 3 and the pinion 5 and the gear ratio between the second gear wheel 4 and the drive pinion 6 are appropriately determined, the displacement of the spindle 1 can be indicated by the two pointers 12, 13 on the dial plate 16 in two different units, say, in millimeters and in inches.

Meanwhile, in accordance with the rotation of said pinion 5 and said drive pinion 6, the gear wheels 7, 8 rotate against the hair spring 10 and the coil spring 9. Thereby the forces exerted by said hair spring 10 and said coil spring 9 which work against the rotation of said gear wheels 7, 8 have the effect of eliminating the backlash in the engagement between the first gear wheel 3 and the pinion 5 and that between the second gear wheel 4 and the drive pinion 6.

Such being the composition of the present invention, the present invention makes it possible to indicate the measured displacement of the spindle by the two pointers 12, 13 on the dial plate 16 in two different units of length, say, in inches and millimeters at the same time, or in inches and in an enlarged scale of said inches (say, five times), thereby dispensing with the bother of consulting a conversion table and improving the efficiency of measurement.

What is claimed is:

1. Dial guage for measuring length in units belonging to two different systems of measurement, said gauge comprising:

a frame, a first shaft rotatably mounted in said frame and carrying a pinion fixed thereto, a spindle mounted in said frame for longitudinal movement in dependence on the length to be measured and carrying a rack which meshes with said pinion, first and second gears fixed to said first shaft to rotate with said pinion, a second shaft mounted in said frame and carrying a first pointer, a center pinion fixed to said second shaft and meshing with said first gear, a drive pinion rotatably mounted on said second shaft, carrying a second pointer, and meshing with said second gear, a dial carrying scales calibrated in units of said two different systems, with each scale cooperating with one of said pointers, and the gear ratios between the gears on said first shaft and the pinions on said second shaft bearing the same proportional relationship as the units of said two different systems, and backlash eliminating means connected to resiliently resist rotation of one of said gears relative to said frame and rotation of the other of said gears relative to said one gear.

2. Dial gauge of claim 1, wherein said backlash-eliminating means consists of a spring-biased shaft (11'); a gear (7) rotatably supported on said shaft, connected to said shaft by a spring, and meshing with the center pinion; and a gear (8) fitted to said shaft and meshing with said drive pinion.

3. A dial gauge as claimed in claim 1, wherein said backlash eliminating means comprises two additional gears which mesh with said center pinion and said drive pinion respectively, and are coaxially and rotatably supported on a third shaft, while a boss fixed on said third shaft and one of said additional gears are connectecd by a coil spring and one end of a helical hair spring is attached to the frame of the dial gauge while the other end of said hair spring is attached to said boss.

4. A dial gauge as claimed in claim 3, in which the ratio between the number of teeth on said additional gears and the pinions which they engage is the same as that between said first and second gears and the pinions which they engage.

* * * * *